July 31, 1951          J. O. CORNER          2,562,527
LIGHT-SENSITIVE PHOTOGRAPHIC STRIPPING ELEMENT
Filed Sept. 16, 1948
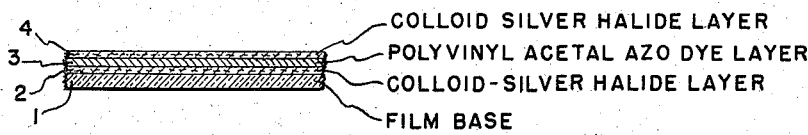
INVENTOR.
JAMES OLIVER CORNER
BY
ATTORNEY.

Patented July 31, 1951

2,562,527

UNITED STATES PATENT OFFICE 2,562,527

LIGHT-SENSITIVE PHOTOGRAPHIC STRIPPING ELEMENT

James Oliver Corner, Wilmington, Del., assignor to E. I. du Pont de Nemours & Company, Wilmington, Del., a corporation of Delaware Application September 16, 1948, Serial No. 49,650

5 Claims. (Cl. 95—2)

This invention relates to photography and more particularly to photographic elements which bear a novel stripping layer. Still more particularly it relates to photographic film elements which contain a polyvinyl acetal azo dye layer which serves as a blue-light absorbing layer and a water-soluble stripping layer.

Various polyvinyl acetal dyes, dye intermediates and color-formers are known. They have found utility in various layers of photographic elements. These acetals, however, vary somewhat in chemical and physical properties and some care must be taken in selecting them for a certain purpose.

An object of this invention is to provide a new and improved stripping film. Another object is to provide a stripping film element for bipack film which has improved characteristics and screens blue-light from the remaining layers of the bipack. Still other objects will be apparent from the following description of the invention.

It has been found that a restricted class of yellow polyvinyl acetal azo dyes are very useful as blue-light absorbing layers of photographic elements and can readily be stripped from the remainder of the element.

In addition to acetal substituents containing the azo dye nucleus, the yellow polyvinyl acetal azo dyes contain acetal groups from aliphatic and aromatic carboxylic and sulfonic acids which confer water-soluble characteristics to the final dyes. In general, the polymeric azo dyes contain a chain of at least 100 carbon atoms up to 4,000 carbon atoms, from 2 to 6 aliphatic or aromatic carboxylic acid or sulfonic acid groups per 15 to 80 intralinear $$-CH_2-CHOH-$$

groups and per 1 azo dye group. These polymeric azo dyes may be illustrated by the general formula:

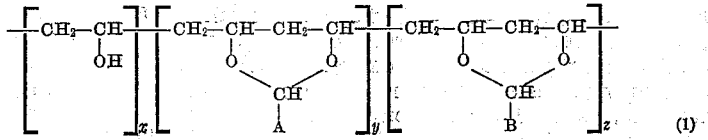

(1)

where A is a saturated aliphatic hydrocarbon radical of 1 to 6 carbon atoms or a benzene radical which radicals are substituted by a group of the formula —COOX or —SO$_3$X where X is hydrogen, alkali metal, e. g., sodium and potassium, or ammonium, B is a yellow azo dye nucleus, $x$ is a number from 15 to 80, $y$ is a number from 2 to 6, and $z$ is 1.

The polyvinyl acetal azo dyes which are described above can be prepared by (a) acetalization of polyvinyl alcohol with (1) aldehydes containing a water solubilizing group and (2) aldehydes containing a dye-forming nucleus capable of reacting with a diazonium salt to form a yellow azo dye and (b) coupling with a diazonium salt under alkaline conditions. The two acetalization reactions may be carried out simultaneously or step-wise in any desired order by heating the components to a temperature at 50° C. to 100° C. in the presence of any condensation catalyst of acid reaction, e. g., phosphoric acid and preferably in the presence of an organic solvent, e. g., methanol, ethanol, dioxane or ethylene glycol, preferably the last.

A class of yellow polyvinyl acetal azo dyes which have been found to be especially well suited for use as stripping layers in the novel stripping films of this invention are the yellow azo dyes of polyvinyl acetal color formers which contain a pyrazolone radical attached to an amidobenzaldehyde acetal group. These preferred color formers are disclosed in Martin U. S. application Serial No. 682,137, filed July 8, 1946, now Patent No. 2,476,988. The yellow azo dyes have the following general formula:

film is sensitized to red or green light preferably the latter.

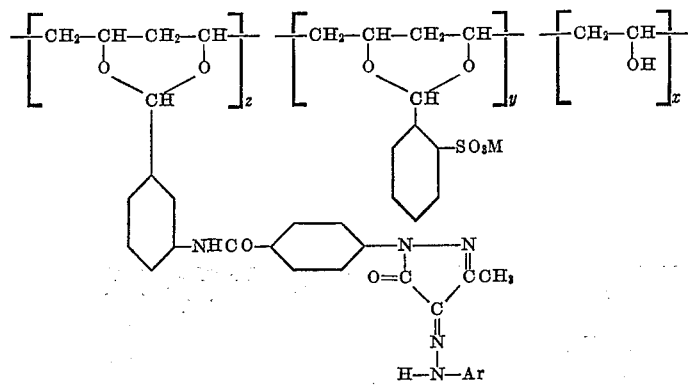

(2)

where Ar is a substituted or unsubstituted aromatic ring (e. g., phenyl, o-, m-, or p-tolyl, m- or p-sulfophenyl, 4-sulfo-1-naphthyl, 1-sulfo-2-naphthyl, 6,8-disulfo-2-naphthyl, p-carboxyphenyl, 2-methyl-5-chlorophenyl, p-chlorophenyl and 2,4-dimethylphenyl, etc.): M is Na, K, NH$_4$, or hydrogen; $z=1$; $y=2$ to 6; and $x=15$ to 80.

A stripping film suitable as the front film for a bipack film is shown in the drawing. It is made by coating a film base 1 on one surface with a water-permeable colloid silver halide emulsion, e. g., a gelatin silver iodo-bromide emulsion layer 2. A layer 3 composed of one of the yellow polyvinyl acetal azo dyes referred to above is coated onto the silver halide emulsion layer from an aqueous ethanol solution. After drying the resulting yellow filter stripping layer there was deposited on it a light-sensitive layer 4 from a water-permeable colloid silver halide emulsion.

The water-soluble macromolecular acetals of vinyl alcohol polymers described above can be applied to the contiguous layer from a solution or dispersion in the same general manner that gelatin overcoatings are applied. The acetal layers so applied should be of such a thickness that they may be readily stripped from the layer on which they are coated. The exact thicknesses can be readily determined by experiment. Thicknesses of 0.0001 to 0.0005 inch, in general, are satisfactory. Materially thinner layers, e. g., 0.05 to 2.0 microns, in general, adhere quite firmly and are consequently very difficult to strip. They may be applied from aqueous or organic solvent solutions. Useful solvents are the water-soluble alcohols, e. g., methanol, ethanol, acetone, dioxane, etc. Mixtures of such solvents with water are quite useful. The coating solutions are preferably substantially neutral. Their pH can be adjusted by neutralizing the free acid groups with bases capable of yielding water-soluble salts, e. g., alkali metals, ammonia, and amines, e. g., dimethylamine, triethylamine and mono-, di- and tri-ethanolamine, etc.

The rear film for the bipack merely consists of a transparent film base which carries a light-sensitive silver halide water-permeable colloid emulsion layer. It is generally sensitized to red or green light, preferably the former. The emulsion surfaces of the two films are placed in contact for exposure to a colored image field. The bottom layer of the front film is therefore closest to said field. It is generally sensitive to blue light whereas the outer layer of such front film is sensitized to red or green light preferably the latter.

In using the film, the two emulsion surfaces of the front film element and the rear film element are placed in a camera so that the front film is first exposed through the base. The two films are then developed whereby three-color separation records are formed in the respective layers of the bipack element. The color-separation records of the front film are then separated by stripping the green-sensitive record of element from the remaining record. The former record is then transferred to a film support known as a "blank" while the combination is then fixed, washed, and dried. The film element may be transferred to a "blank" and the blue-sensitive record stripped from the green record affixed to the blank, if desired, and the latter record may then be fixed, washed, and dried. The blue and red records may be fixed, washed, and dried in like manner. Color prints made from the separated developed records are then superimposed in register on a transparent support whereby a positive multicolor picture is formed.

The novel yellow polyvinyl acetal azo dye stripping layers, however, are not limited to use in the front film of a bipack. They may be used in a monopack which has one or two stripping layers and three light-sensitive silver halide layers. Thus, they may be substituted for the stripping layer of White U. S. P. 2,363,764 which contains a yellow filter dye or pigment.

The invention will be further illustrated by the following examples. The parts are by weight.

*Example I*

A mixture of 20 parts of 3 - [4 - (5 - ethyl - carbonato - 3 - methyl - 1 - pyrazolyl)benz - amido]benzaldehyde ethylene glycol acetal (described in Martin U. S. application Serial No. 682,137), 35 parts of o-sulfobenzaldehyde, 300 parts of ethylene glycol, 5 parts of 85% phosphoric acid, and 50 parts of polyvinyl alcohol having an average molecular weight of 45,000 to 55,000 was heated at 65° C. for one hour. After about 15 minutes of heating, the reaction became quite thick and 40 parts of warm ethanol was added. Subsequently, 40 parts of warm ethanol was added every 10 minutes during the heating cycle until a total of 300 parts had been added. The reaction mixture was then diluted with 500 parts of acetone and cooled to 20° C. The polymer was collected on a filter and then slurried in a mixture of 300 parts of methanol and 600 parts of acetone and neutralized with triethylamine. The polymer was again collected on a filter, reslurried in fresh mixed solvent of the above composition, filtered, and finally washed twice in 500 parts of acetone. After drying at room temperature, the yield was 74 parts. Sulfur analysis showed that the product contained 19.4% o-sulfobenzaldehyde by weight. Colorimetric analysis for color-former showed that the product contained 15.8% by weight of 3-[4-(5-ethylcarbonato-3-methyl-1-pyrazolyl)-benzamido]benzaldehyde ethylene glycol acetal. This analysis corresponds to values of $x=35$, $y=2.6$ and $z=1$ in Formula 2.

A diazo solution of sulfanilic acid was prepared as follows: 3.8 parts of sulfanilic acid was dissolved in 16 parts of 5% sodium hydroxide and 50 parts of water, and 24.5 parts of 10% sulfuric acid was added to give a fresh precipitate of sulfanilic acid. Ice was then added to bring the temperature to 0° C. A solution of 1.38 parts of sodium nitrite in 15 parts of water was then added, followed by 16 parts of 5% sodium hydroxide and 5 parts of sodium acetate.

A solution of the polymer described above was prepared by dissolving 5 parts of it in 95 parts of 10% ethanol and 1 part of 20% sodium carbonate. To this was added 10 parts of the diazo solution described above. The result was a bright yellow solution of polymeric dye. Spectrophotometric determination showed maximum absorption at 395 millimicrons with good transmission in the green and red portions of the spectrum.

A cellulose nitrate film base having a thin gelatin coating was coated with a gelatino-silver iodobromide emulsion to a coating weight of 52 mg. AgBr per sq. dec. After drying, a solution of yellow polyvinyl acetal dye prepared as described above was coated as a yellow filter layer to a coating weight of 20 mg. of polymer per sq. dec. After drying a gelatino-silver iodobromide emulsion containing 1,1'-diethyl 2,2'-cyanine iodide as an ortho-sensitizing dye was coated on the yellow filter layer to a coating weight of 48 mg. per sq. dec. A gelatin solution containing 450 grams of gelatin per 14,400 grams of water was coated in like manner to form a thin antiabrasion layer. This film element constitutes the front film of a bipack.

A similar film base was coated with a thin gelatin substratum and dried. A gelatino-silver iodobromide emulsion containing as a green-blind red sensitizing dye 1,1'-diethyl-2,4-carbocyanine iodide was coated on the gelatin substratum. It constitutes the rear film of a bipack.

The two films were placed in a camera with the gelatin layers in contact and exposed to a color scene and processed as follows:

(1) Developed for ten minutes in a developer made by admixing the following components:

| | |
|---|---|
| Hydroquinone | grams 7.5 |
| N-Methylaminophenol | do 5.0 |
| Sodium sulfite (anhydrous) | do 60.0 |
| Sodium carbonate (anhydrous) | do 50.0 |
| Potassium bromide | do 4.5 |
| Water | liter 1.0 |

(2) Treated for two minutes in an aqueous stop bath of the composition

| | Volumes |
|---|---|
| Acetic acid (28%) | 1 |
| Water | 20 |

The outer layer of the front film was then pressed into intimate contact with a second registered support comprising a transparent film base coated with a gelatin layer having a coating weight of about 75 mg. per sq. dec. which had been wetted to promote adhesion between the gelatin surfaces of the respective elements. During the period of contact the water in the plain gelatin permeated the contiguous developed green-sensitive layer and wetted the yellow polyvinyl acetal layer loosening the bond between it and the green-sensitive layer which adheres to the gelatin layer of the second support and the resulting element has the structure similar to that shown in Fig. II of U. S. application Ser. No. 651,996, filed March 5, 1946, now Patent No. 2,462,503. The latter element may then be fixed, washed and dried. The element stripped from the latter element as well as the rear film of the bipack can be fixed, washed and dried in like manner. During the washing the yellow polyvinyl acetal layer is completely removed and washed away. The three developed color-separation negatives thus obtained are suitable for registration color printing.

*Example II*

A mixture of 8 parts of benzoylacetamidobenzaldehyde ethylene glycol acetal, 35 parts of o-sulfobenzaldehyde, 5 parts of 85% phosphoric acid, 300 parts of ethylene glycol, and 50 parts of polyvinyl alcohol was stirred at 65° C. for one hour. The addition of alcohol from time to time was made as described in Example I. The polymer was isolated and purified as described in Example I to give a yield of 65 parts of final product.

A solution of the polymer described above was prepared by dissolving 5 parts of it in 95 parts of 10% ethanol and 1 part of 20% sodium carbonate. To this was added 10 parts of the diazo solution described in Example I. The result was a bright yellow solution of polymeric dye. Spectrophotometric determination showed maximum absorption at 380 millimicrons with very good transmission in the green and red portions of the spectrum. A film element of the type disclosed in Example I was prepared and processed with similar results.

The invention is not limited to yellow dyes made from the polyvinyl acetals named in the examples, and similar dyes can be made from polyvinyl acetals derived from the following aldehydes:

3-[4-(5-ethylcarbonato-3-methyl-1-pyrazolyl)-benzamido]benzaldehyde
3-[3-(5-ethylcarbonato-3-methyl-1-pyrazolyl)-4-chlorobenzamido]benzaldehyde
3-[3-(5-benzoxy-3-methyl-1-pyrazolyl)-4-chlorobenzene-sulfonamido]benzaldehyde
3-[5-(5-ethylcarbonato-3-methyl-1-pyrazolyl)-4-methylbenzamido]benzaldehyde
3-[4-(5-ethylcarbonato-3-phenyl-1-pyrazolyl)-benzamido]benzaldehyde
3-[3-(5-ethylcarbonato-3-methyl-1-pyrazolyl)-4-methoxybenzamido]benzaldehyde
3-[3-(5-ethylcarbonato-3-$\alpha$-thienyl-1-pyrazolyl)-4-chlorobenzamido]benzaldehyde
3-(3-methyl-2-hydroxybenzamido-)benzaldehyde
3-(1-hydroxynaphthalene-2-sulfonamido)benzaldehyde
3-(4-carboxybenzoylacetamido)benzaldehyde Of these, the polyvinyl acetals derived from pyrazolone type intermediates are preferred.

Diazonium salts capable of reacting with the polyvinyl acetal color formers and especially the 5-acyloxypyrazole amidoacetals of polyvinyl alcohol which can be used in place of the sulfanilic acid of the foregoing examples to give yellow azo dyes are those derived from metanilic acid, naphthionic acid, aniline, toluidine, 2-naphthylamine-1-sulfonic acid, 2-naphthylamine-6,8-disulfonic acid, p-amino-benzoic acid, 4-chloro-2-aminotoluene, p-chloroaniline and m-xylidine.

The degree of reaction of the polyvinyl alcohol nuclei (B in Formula 1) and water solubilizing groups (A in Formula 1) has a profound effect on the properties and usefulness of the polyvinyl acetal azo dyes. If $x$ is less than 15 the polymers are so highly substituted that they do not dissolve in aqueous alcohol for the preparation of coating solutions. If $x$ is greater than 80 the substitution is so low that the coated layers are deficient in their light filtering action. The ratio of $y$ to $z$ is also critical. If it is less than 2:1 the polymers are not soluble enough to enable the bipack film to be stripped. If it is greater than 6:1, the polymer "bites" into the gelatin emulsions so strongly that stripping is impossible. For the preferred embodiment of this invention, Formula 2, the best all around properties are found in polymers where $x = 25$ to $50$, $y = 2$ to $3$, and $z = 1$.

Various hydrophilic colloid binding agents can be used in place of the gelatin of the light-sensitive silver salts or for the "blanks." They may be either natural or synthetic colloids. Suitable materials include hydrophilic modified polyvinyl alcohol and its ethers, esters, and acetals, hydrophilic nylons, agar agar, albumin, etc.

The novel water-soluble polyvinyl acetal yellow azo dye layers of this invention have the advantage that they do not migrate from one light sensitive layer into another. They can, however, be completely dissolved or washed off by water in a stripping operation during the photographic processing of color film.

As many widely different embodiments of this invention can be made without departing from the spirit and scope thereof, it is to be understood that the invention is not to be limited except as defined by the claims.

What is claimed is:

1. A photographic element comprising a support bearing at least two light-sensitive silver halide emulsions one of which has an extra range of sensitivity in addition to its normal blue sensitivity which are joined by a water-soluble yellow polyvinyl acetal azo dye layer, said dye having the general formula:

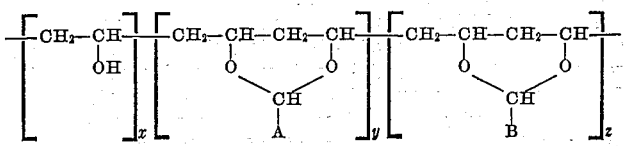

where A is a radical selected from the group consisting of alkylsulfonic acids, alkyl carboxylic acids of 1 to 6 carbon atoms and their alkali metal and ammonium salts and phenyl sulfonic and phenyl carboxylic acids and their alkali metal and ammonium salts, B is a yellow azo dye structure, $x$ is 15 to 80, $y$ is 2 to 6, and $z$ is 1.

2. A photographic element comprising a support bearing at least two light-sensitive silver halide emulsions one of which has an extra range of sensitivity in addition to its normal blue sensitivity which are joined by a water-soluble yellow polyvinyl acetal azo dye layer, said dye having the general formula:

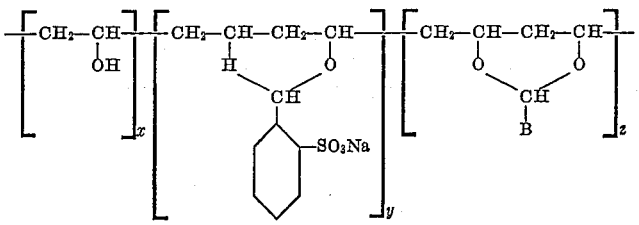

where B is a yellow azo dye structure, $x$ is 15 to 80, $y$ is 2 to 6, and $z$ is 1.

3. A photographic element comprising a support bearing at least two light-sensitive silver halide emulsions one of which has an extra range of sensitivity in addition to its normal blue sensitivity which are joined by a layer consisting of a water-soluble polyvinyl acetal azo dye of the general formula:

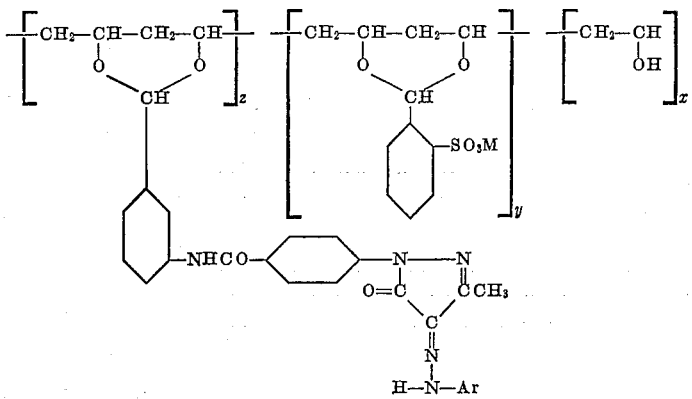

where Ar is selected from the group consisting of phenyl, o-, m- and p-tolyl, m- and p-sulfophenyl, 4-sulfo-1-naphthyl, 6,8-disulfo-2-naphthyl, p-carboxyphenyl, 2-methyl-5-chlorophenyl, p-chlorophenyl and 2,4-dimethoxyphenyl, M is taken from the group consisting of alkali metal, —NH$_4$, and hydrogen, $x$ is 25 to 45, $y$ is 2 to 3, and $z$ is 1.

4. A photographic film comprising a transparent film base bearing in order a colloid silver halide emulsion layer which is sensitive to blue light, a water-soluble yellow polyvinyl acetal azo dye layer and a colloid silver halide emulsion layer which has an extra range of sensitivity in one of the green and red regions of the spectrum, said dye having the general formula:

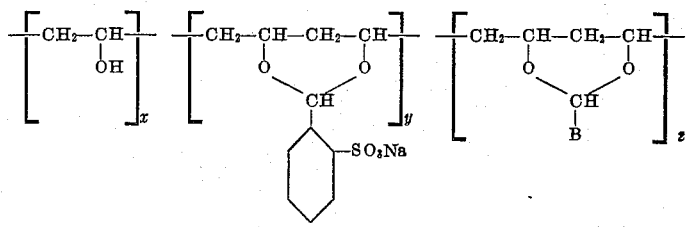

where B is a yellow azo dye structure, $x$ is 15 to 80, $y$ is 2 to 6, and $z$ is 1.

JAMES OLIVER CORNER.

REFERENCES CITED

The following references are of record in the file of this patent:

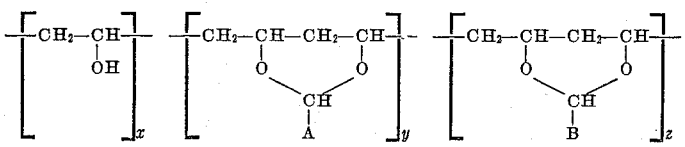

where A is a radical selected from the group consisting of alkylsulfonic acids, alkyl carboxylic acids of 1 to 6 carbon atoms and their alkali metal and ammonium salts and phenyl sulfonic and phenyl carboxylic acids and their alkali metal and ammonium salts, B is a yellow azo dye structure, $x$ is 15 to 80, $y$ is 2 to 6, and $z$ is 1.

5. A photographic film comprising a transparent film base bearing in order a colloid silver halide emulsion layer which is sensitive to blue light, a water-soluble yellow polyvinyl

UNITED STATES PATENTS

| Number | Name | Date |
|---|---|---|
| 2,319,102 | Albers et al. | May 11, 1943 |
| 2,462,503 | Jennings | Feb. 22, 1949 |

FOREIGN PATENTS

| Number | Country | Date |
|---|---|---|
| 546,631 | Great Britain | July 22, 1942 |

Certificate of Correction

Patent No. 2,562,527                                                 July 31, 1951

JAMES OLIVER CORNER

It is hereby certified that error appears in the printed specification of the above numbered patent requiring correction as follows:

Column 8, claim 2, for that portion of the formula within the center bracket reading and that the said Letters Patent should be read as corrected above, so that the same may conform to the record of the case in the Patent Office.

Signed and sealed this 25th day of December, A. D. 1951.

[SEAL]

THOMAS F. MURPHY,
*Assistant Commissioner of Patents.*